United States Patent [19]
Akatsu et al.

[11] Patent Number: 5,569,524
[45] Date of Patent: Oct. 29, 1996

[54] LAMINATED SHEET AND A BONDED LAMINATED SHEET

[75] Inventors: Masamichi Akatsu, Niihari-gun; Takeo Higashi, Tsuchiura; Hiromitsu Makita; Tomoo Susa, both of Iwaki; Toshiya Mizuno, Tsuchiura, all of Japan

[73] Assignee: Kureha Chemical Industry Co., Ltd., Tokyo, Japan

[21] Appl. No.: 163,754

[22] Filed: Dec. 7, 1993

[30] Foreign Application Priority Data

Dec. 7, 1992 [JP] Japan ..................... 4-351320

[51] Int. Cl.$^6$ ............... B32B 7/10; B32B 27/08; B32B 27/12; B32B 27/30
[52] U.S. Cl. ............... 428/215; 428/246; 428/262; 428/337; 428/345; 428/421; 428/518; 428/520; 428/522; 525/199; 525/227
[58] Field of Search ............... 428/225, 246, 428/260, 252, 262, 264, 265, 286, 421–422, 516, 518, 520, 522, 345, 354, 355, 215, 216, 337; 53/DIG. 3; 156/272.2, 273.5, 275.1; 525/199, 227

[56] References Cited

U.S. PATENT DOCUMENTS

| | | | |
|---|---|---|---|
| 3,253,060 | 5/1966 | Koblitz et al. | 260/900 |
| 3,900,360 | 8/1975 | Leatherman | 156/272 |
| 4,317,860 | 3/1982 | Strassel | 428/421 |
| 4,317,861 | 3/1982 | Kidoh et al. | 428/421 |
| 4,444,826 | 4/1984 | Sasaki et al. | 428/216 |
| 4,556,589 | 12/1985 | Neumann et al. | 428/35 |
| 4,585,701 | 4/1986 | Bartoszek et al. | 428/421 |
| 4,677,017 | 6/1987 | DeAntonis et al. | 428/214 |
| 5,132,164 | 7/1992 | Moriya et al. | 428/199 |
| 5,242,976 | 9/1993 | Strassel et al. | 525/72 |

FOREIGN PATENT DOCUMENTS

| | | |
|---|---|---|
| 0060421 | 9/1982 | European Pat. Off. . |
| 0450994 | 10/1991 | European Pat. Off. . |
| 2445347 | 7/1980 | France . |
| 60-252781 | 12/1985 | Japan . |
| 3181581 | 8/1991 | Japan . |

OTHER PUBLICATIONS

Database WPI Week 9138, Derwent Publ. Ltd., London, GB; AN 91–276809 & JPA 3 181 581 (Onishi) 7 Aug. 1991.
Patent Abstracts of Japan vol. 009, No. 034 (M–357) 14 Feb. 1985 & JPA 59 176 016 (Maruyama Kogyo) 5 Oct. 1984.
Database WPI Week 8209, Derwent Publ. Ltd., London, GB; AN 82–16667E & JPA 57 012 646 (Kureha Chem. Ind.) 22 Jan. 1982.

Primary Examiner—Paul J. Thibodeau
Assistant Examiner—Vivian Chen
Attorney, Agent, or Firm—Sherman and Shalloway

[57] ABSTRACT

A laminated sheet suitable for high-frequency welding comprises a vinylidene fluoride resin layer (A), a bonding layer (B) consisting of a blend of vinylidene fluoride resin and a copolymer resin consisting of methyl methacrylate and alkyl ester of acrylate, whose alkyl group has 3–5 carbon atoms, a base-material layer (C) of vinyl chloride resin bonded to the bonding layer (B), and a base-cloth layer (D) bonded to the base-material layer (C). A bonded laminated sheet obtained by bonding two laminated sheets with high-frequency welding and the application of the bonded laminated sheet to tents are also disclosed.

15 Claims, 1 Drawing Sheet

LAMINATED SHEET AND A BONDED LAMINATED SHEET

BACKGROUND OF THE INVENTION

1. Field of the Invention

This invention relates generally to a laminated sheet and a bonded laminated sheet, and applications thereof, and more specifically to a laminated sheet suitable to be bonded by high-frequency welding, comprising a vinylidene fluoride resin layer, a bonding layer consisting of a specific resin composition, and a base-material layer; or a laminated sheet prepared by laminating a base-cloth layer with the base-material layer; and a method of bonding these sheets together by high-frequency welding; and applications of such laminated sheets to tent fabrics.

2. Description of the Background Art

Tents and tarpaulins are used for a wide variety of applications; tarpaulins being used as protective coverings in various applications, such as ships, trucks, railroad freight cars, civil engineering and construction, warehouses, and agricultural uses; and tents being used in a wide range of applications, such as shop-front shades, arcade tents, portable tents, structural tents. Various materials and structures best suited to specific applications are being adopted for tents and tarpaulins.

Tents and tarpaulins include those manufactured by bonding a top-surface layer sheet (overlay sheet) to a base cloth are publicly known. As the base cloth, canvas or other waterproof cloth made of flexible synthetic fiber, such as polyester, polyamide, vinylon, etc., or natural fiber, such as cotton, flax, etc. is most commonly used. A number of waterproofing methods are available, depending on varied waterproofing requirements ranging from applications requiring least waterproofing to those requiring perfect waterproofing. The water-repellency method in which cloth is treated with a water repellent, the dipping method in which cloth is immersed in a resin solution, the coating method in which cloth is coated with a paste resin, and the topping or laminating method in which a film is bonded to a base cloth are selectively used to meet such varied waterproofing applications. For portable tents requiring light-weight, for example, a vinylon cloth treated with the water repellency method, or a polyamide cloth treated with the coating method which requires only a small amount of resin is most commonly used.

The overlay sheet laminated to the surface of the base-cloth layer is required to have flexibility and weather resistance. As the overlay sheet, used is a three-layer laminated sheet in which a soft, vinyl chloride resin base-material layer is bonded to a vinylidene fluoride resin layer having good weather resistance as the top surface layer with a bonding layer interposed therebetween. As the bonding layer in this three-layer laminated sheet, poly-methyl methacrylate (PMMA) resin having good bonding properties has heretofore been used. The PMMA used in such a laminated sheet as the bonding layer, however, tends to be whitened when folded or bent during installation or sewing process, resulting in deteriorated external appearance of tarpaulins or tents due to white streaks in the bonding layer seen through a transparent vinylidene fluoride resin layer as the top-surface layer. To improve this drawback, a copolymer resin having good Flexibility of methyl methacrylate (MMA) and acrylic ester, such as butyl acrylate, has come to be used as the bonding layer.

When manufacturing tents, tarpaulins and other structures for various applications using laminated sheets consisting of an overlay sheet and a base cloth, as described above, a plurality of sheets cut to an appropriate length are usually used in the interests of workability. That is, the edges of these cut-length sheets are lapped and high-frequency welded to form a tent. In structures thus manufactured, however, the bonding strength of the joints often poses a problem, in addition to the above-mentioned whitening of the bonding layer. Bonding strength at relatively high temperatures is required of such structures, particularly when they are used in an environment where temperature rises due to direct sunshine. When two laminated sheets are bonded together by lapping the edges thereof, bonding strength depends on the bonding strength of the bonding layer in the underlying laminated sheet located in the vicinity of the lapped surfaces. When a base-cloth layer is used in each of the laminated sheets, the bonding strength of the bonding layer is particularly important, when considering the effects of the tensile strength of the base-cloth layer which is higher than the bonding strength of the bonding layer of the overlay sheet. Consequently, improving the bonding strength of the bonding layer of the overlay sheet, particularly the bonding strength of the bonding layer as the intermediate layer in the high-frequency welded overlay sheet, become a great concern.

When a copolymer resin of MMA and acrylic ester, such as butyl acrylate, is used as the bonding-layer resin, however, flexibility is improved and accordingly the whitening of the bonding layer due to folding can also be prevented, but the bonding strength of the bonding layer to the vinyl chloride resin layer by high-frequency welding becomes lower compared with the bonding layer of PMMA resin, resulting in lowered bonding strength when the laminated sheets are bonded together.

Japanese Published Unexamined Patent Application Hei3 (1991)-181581 discloses a technology in which a composition consisting of certain ratios of PMMA and vinylidene fluoride resin is used as an adhesive to hot-glue vinylidene fluoride resin to a rigid vinyl chloride resin molding. In the upper right column on Page 3 of the aforementioned publication, it is stated that a copolymer of acrylic ester and MMA, in place of PMMA, is also in the scope of analogical inference. The copolymer resin used in the present invention, however, is not specifically used in the aforementioned publication. The high-frequency welding process used in the present invention also is not adopted in the aforementioned publication, as will be described later.

SUMMARY OF THE INVENTION

This invention provides a laminated sheet comprising a vinylidene fluoride resin layer (A), a bonding layer (B) consisting of a composition of 60–95 wt. % of a copolymer resin consisting of 60–90 mol % of methyl methacrylate, 40–10 mol % of the alkyl ester of acrylate, whose alkyl group has 3–5 carbon atoms, and a 5–40 wt. % of vinylidene fluoride resin, and a base-material layer (C) having vinyl chloride resin bonded to the bonding layer (B). This invention also provides a laminated sheet having a base-cloth layer (D) consisting of canvas or waterproof cloth as part of the base-material layer (C). This invention also provides a method of manufacturing a bonded laminated sheet by lapping these laminated sheets and high-frequency welding the lapped areas. This invention also provides the application of the bonded laminated sheet to tent fabrics.

It is therefore an object of this invention to provide a laminated sheet having such good flexibility that it is not whitened even when folded or bent. It is another object of this invention to provide a method of manufacturing a bonded laminated sheet to which high bonding strength at relatively high temperatures is imparted by high-frequency welding. These and other objects, features and advantages of this invention will become apparent from the following detailed description.

DETAILED DESCRIPTION OF THE INVENTION AND PREFERRED EMBODIMENTS

Figure 1:
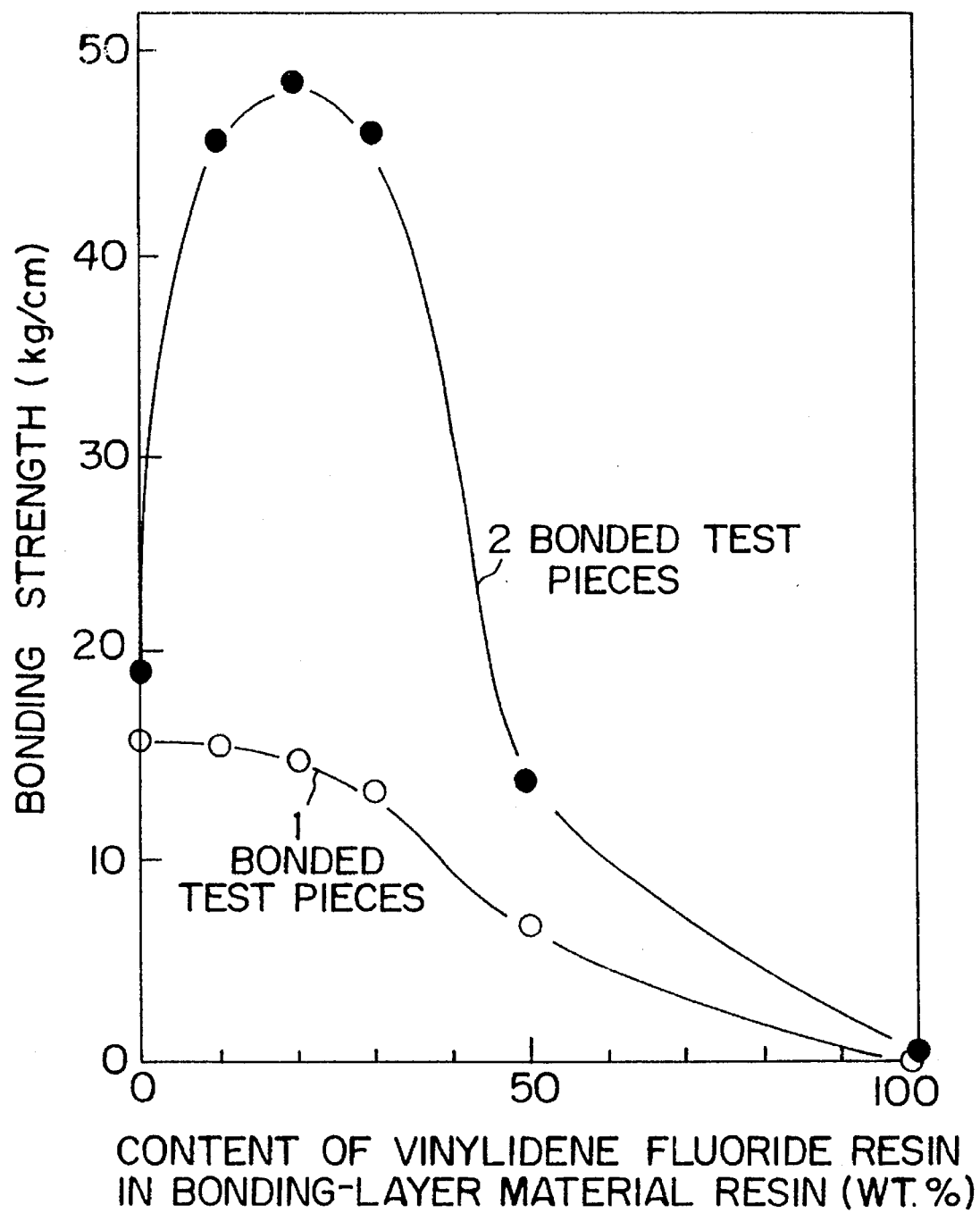
FIG. 1 is a graph of assistance in explaining the difference in bonding strength between a test piece (1) that is bonded by hot press and a test piece (2) that is bonded by high-frequency welding according to this invention.

As vinylidene fluoride resin constituting the layer (A) of the laminated sheet embodying this invention, a copolymer containing more than 70 mol % of vinylidene fluoride as a constituent, or a mixture of these polymers may be used, in addition to a homopolymer of vinylidene fluoride. Monomers that can be copolymerized with vinylidene fluoride include tetrafluoroethylene, hexafluoropropyrene, trifluoroethylene, trifluorochloroethylene, vinyl fluoride, etc., and any one kind or more than two kinds of them may be used. The logarithmic viscosity of the aforementioned vinylidene fluoride resin is usually 0.5–2.0 dl/g, or more preferably in the range of 0.85–1.3 dl/g. Logarithmic viscosity was measured using dimethylformamide as solvent under test conditions of concentration: 0.4 g/dl, and temperature: 30° C.

The copolymer resin constituting the bonding layer (B) of the laminated sheet embodying this invention comprises MMA and the alkyl ester of acrylate, whose alkyl group has 3–5 carbon atoms (hereinafter referred to as "acrylic ester" for short). Propyl acrylate, butyl acrylate, pentyl acrylate, etc. may be cited as examples of acrylic ester. Among them, more preferable is butyl acrylate. The ratio of MMA and acrylic ester constituting the copolymer resin is in the range of 60–90 mol %, or more preferably in the range of 70–80 mol % for the former; and in the range of 40–10 mol %, or more preferably in the range of 30–20 mol % for the latter. Other copolymerizable monomers may be included as constituents of the copolymer resin, in addition to the aforementioned two components, so long as the effects of this invention are not hampered.

As the vinylidene fluoride resin constituting the bonding layer (B) of the laminated sheet embodying this invention, that described in reference to the vinylidene fluoride resin (A) may be used as it is.

The ratio of the aforementioned copolymer resin and the vinylidene fluoride resin constituting the bonding layer (B) of the laminated sheet of this invention is in the range of 60–95 wt. %, or more preferably in the range of 70–90 wt. %, or still more preferably in the range of 75–85 wt. % for the former; and in the range of 40–5 wt. %, or more preferably in the range of 30–10 wt. %, or particularly more preferably in the range of 25–15 wt. % for the later. 2-hydroxybenzophenone-based, or benzotriazole-based, or salicylate ester-based and other types of ultraviolet light absorber, heat stabilizer, etc. may be included in a composition constituting the bonding layer (B) so long as the effects of this invention are not hampered.

As the base-material layer (C) having vinyl chloride resin of the laminated sheet of this invention, preferable is that consisting of soft vinyl chloride resin that can be bonded to the aforementioned bonding layer (B) and has good flexibility. The vinyl chloride resin includes not only a vinyl chloride homopolymer but also copolymers of vinyl chloride and other monomers, such as vinyl acetate. As soft vinyl chloride resin, preferable is a mixture of the aforementioned vinyl chloride resin and a plasticizer, such as dioctyl phthalate (DOP), and a mixture of vinyl chloride resin and other soft resins may also be used. As the base-material layer (C), a cloth which is waterproofed by coating, dipping, or laminating a soft vinyl chloride resin, for example, may be used from among the materials of the base-cloth layer (D), which will be described later. In such a case, the base-material layer (C) may also be served as the base-cloth layer (D).

The base-cloth layer (D) constituting the laminated sheet of this invention comprises canvas or other waterproof cloth. The base-cloth material (D) may be treated with any of the aforementioned waterproof treatments so that the base-cloth material (D) has different waterproof properties in accordance with waterproofing requirements for specific applications, and may be of a single-layer construction or of a multiple-layer construction. Any of woven or non-woven fabrics made of cotton, flax, glass, polyester resin, polyamide resin, polyvinylidene-chloride resin, polyvinylalcohol resin, vinyl chloride resin, ultra-high-molecular-weight polyethylene resin, polysulfone resin, polyether-ketone resin, carbon fiber, metallic fiber, etc. is used for a cloth material which is to be waterproofed.

As a coating resin to be used for waterproofing the aforementioned cloth, polyvinyl chloride resin, acrylic-ester resin, vinyl-acetate resin, polyolefin resin, etc. can be used. Flame-retardant agent and/or pigments are usually added to the coating resin.

The thickness of the vinylidene fluoride resin layer (A) constituting the laminated sheet of this invention normally ranges from 0.5 to 60 μm, or more preferably from 1 to 30 μm. Similarly, the thickness of the bonding layer (B) is normally in the range of 1–50 μm, or more preferably in the range of 1–20 μm. Furthermore, the thickness of the base-material layer (C) having vinyl chloride resin is normally in the range of 10–100 μm, or more preferably in the range of 30–50 μm. Although the thickness of the base-cloth layer (D) may be selected appropriately, depending on specific applications, the base-cloth layer (D) for tent fabrics normally ranges in thickness from 0.1 mm to 4 mm.

In the following, the manufacturing process of a tent fabric, as a laminated sheet to be used in this invention, comprising an overlay sheet consisting of a vinylidene fluoride resin layer (A), a bonding layer (B) and a base-material layer (C), and a base-cloth layer (D), which is a tent base-cloth, will be described. To manufacture the aforementioned laminated sheet, the overlay sheet and the tent base-cloth comprising canvas or other waterproof cloth are manufactured or prepared in advance. The overlay sheet can be manufactured with the commonly used 3-layer co-extrusion process. The tent base-cloth can be manufactured with the aforementioned publicly known process in accordance with the required waterproof properties. The overlay sheet and the tent base-cloth can be bonded together with the hot press process, the roll laminate process, or any of various other publicly known processes. They are commonly bonded together with the roll laminate process in which both materials are hot pressed and bonded, or with a process in which they are laminated by means of adhesive.

An adhesive layer necessary for bonding lapped surfaces for lap joining the laminated sheets, which will be described later, is formed in advance on the surface of the tent base-cloth for the laminated sheet. Acrylic ester resins, such as PMMA, having good adhesion properties when used with the lapped surfaces of the tent base-cloth layer and the vinylidene fluoride resin layer (A), are preferably used. A bonding layer (E) is normally formed by applying any of the acrylic ester resins to the lapped surfaces with the coating process. In lap joining the laminated sheets, as described above, an acrylic ester resin film may be interposed between the tent base-cloth layer and the vinylidene fluoride resin layer (A) only at the lapped surfaces, as disclosed in Japanese Unexamined Published Patent Application Sho-59 (1984)-178018.

To manufacture a tent fabric using the laminated sheets manufactured with the aforementioned process, the two laminated sheets having the same layer order of A, B,—E are lapped so that the layer A of one laminated sheet comes in contact with the layer E of the other laminated sheet, and the lapped surfaces are bonded together by high-frequency welding. Such a process is required particularly when the edges of laminated sheets cut to an appropriate length are lap joined in accordance with the construction of the tent to improve workability. This process is also required for the manufacture of tarpaulins and structures other than tents.

High-frequency welding relies on induction heating in which heat is generated within a material by induced electric current. To high-frequency weld the laminated sheets, the edges of the laminated sheets are lapped, the lapped edges are placed between a pair of planar electrodes, and high frequency is radiated on the lap edges while exerting pressure onto them. High-frequency welding conditions are as follows: Frequency: any frequency in the range of 0.4–100 MHz is normally used, and more particularly either of two frequencies of 27.12 MHz and 40.46 MHz is used. Current: 0.05–10 A. Pressing pressure: 0.5–20 kg/cm$^2$. Energization time (weld time): 1–60 seconds. The width of the weldment may be determined appropriately, but is preferably 5–70 mm For tent fabrics.

The bonded laminated sheet obtained by the aforementioned high-frequency welding has good flexibility owing to the chemical composition of the bonding layer (B). Furthermore, the bonded laminated sheet thus formed has sufficient strength to withstand the conditions to be encountered in service as a tent fabric since the bonding strength of the bonding layer (B) is improved by the composition of the bonding layer (B) and high-frequency welding, and accordingly the bonding strength of the bonded laminated sheets is also improved.

Although an example where a tent base-cloth is used as the base-cloth layer (D) has been described in the foregoing, various fabricated goods or structures may be manufactured by high-frequency welding overlay sheets comprising a vinylidene fluoride resin layer (A), a bonding layer (B) and a base material layer (C), or a combination of an overlay sheet and other materials. In the following, embodiments of this invention will be specifically described. Needless to say, this invention is not limited to these embodiments.

(Embodiment 1)

To confirm the effects of this invention, an overlay sheet was manufactured by laminating and co-extruding a (A) 4-μm-thick vinylidene fluoride resin (KF #1000 manufactured by Kureha Chemical Industry Co., Ltd., logarithmic viscosity: 1.0 dl/g) layer, a (B) 6-μm-thick bonding layer, and a (C) 40-μm-thick soft vinyl- chloride resin (vinyl chloride resin with which 40 PHR of DOP as plasticizer was blended) layer in that order. As constituents of a resin composition constituting the bonding layer, 90 wt. % of a copolymer of MMA and acrylic butyl (Mol ratio of MMA/acrylic butyl=80/20, melt index at a temperature of 230° C. and a load of 5 kg: 3 g/10 min. Hereinafter referred to as "copolymer" for short.) and 10 wt. % of vinylidene fluoride resin (KF #1000 manufactured by Kureha Chemical Industry Co., Ltd.) were used. 6 PHR of "Tinuvin 327", benzotriazol ultraviolet light absorber manufactured by Ciba-Geigy Ltd. was blended with the copolymer resin. A (D) tent base-cloth (a polyester resin cloth coated with soft vinyl chloride resin) was laminated on the soft vinyl chloride resin side of the 3layer overlay sheet in a 165° C. hot press. A thin PMMA coating film was then formed on the surface of the tent base-cloth of the laminated sheet by applying a methylethyl ketone solution (concentration: 15%) of PMMA to a film thickness of 6 μm by a coating bar. Then, test pieces of 5 mm in width and 100 mm in length were taken from the coated laminated sheet.

Edges of the two test pieces thus obtained were lapped, with the overlap length being 10 mm, so that the vinylidene fluoride resin layer of one test piece comes in contact with the PMMA coating-film layer of the other test piece, and the lapped area was high-frequency welded (weld width: 10 mm) from the side of the vinylidene fluoride resin layer of the upper test piece. Welding was done using "YF-7000" high-frequency welder, manufactured by Yamamoto Vinyter Co., Ltd. Welding conditions; frequency 40.46 MHz, press pressure: 4 kg/cm$^2$, current 1.0 A, welding time: 5 seconds, cooling time (the time in which the work was allowed to stand under pressure after the lapse of welding time): 10 seconds. The 190-mm long bonded test pieces obtained by high-frequency welding in the above-mentioned manner were subjected to a tensile test in a 65° C. atmosphere at a stress rate of 20 mm/min. to obtain their bonding strength in terms of tensile strength. The part being torn was the bonding layer on the overlay sheet close to the lapped surfaces. Table-1 shows the bonding strength of the high-frequency welded test pieces, as expressed in terms of tensile strength. The bonded test pieces were bent 180 towards the side of the vinylidene fluoride resin layer and toward the side of the tent base-cloth layer, and a load of 5 kg was applied to the test pieces, which were then allowed to stand for ten minutes. The degree of whitening (0: not whitened, x: whitened) of the bent portion of the test pieces was observed. The results are shown in Table-1.

The two test pieces of 30 mm in width and 100 mm in length were bonded under the same conditions, except the weld width being 40 mm, in place of 10 mm, and the resistance to creep (the weight used: 20 kg) of the test pieces under a 65° C. dry heat was measured. The time elapsed until the bonded area was peeled and the weight fell is also given in Table-1.

(Embodiments 2–3, Comparative Examples 1–4)

The bonding strength obtained by high-frequency welding, whitening and resistance to creep of the test pieces bonded under the same conditions as that For Embodiment 1, except For the chemical composition of the bonding layer changed to that shown in Table-1, were measured. The results are shown in Table- 1.

(Comparative Examples 5–10)

The bonding strength obtained by high-frequency welding and the bonding strength obtained only by thermocompression bonding were compared. For the laminated sheet using a tent base-cloth which cannot be thermocompression bonded because of its large thickness, the following method was adopted.

The 1-mm thick vinylidene fluoride resin single-layer sheets, the 1-mm thick soft vinyl chloride resin single-layer sheets, and the 6 μm thick single-layer sheets of a bonding-layer material resin, similar to those used in Embodiments 1–3 and Comparative Examples 1–3, were prepared using a T die. Test pieces of 100 mm in length and 5 mm in width were taken from these sheets. From the single-layer sheets of the bonding layer material resin, test pieces of 10 mm in length and 5 mm in width were taken. 10-mm wide edges of the vinylidene fluoride resin sheet test pieces and the soft vinyl chloride resin sheet test pieces were lapped so that the test pieces after bonding were aligned straight, the bonding-layer material resin sheet test pieces were interposed therebetween so that the edges thereof were aligned with the lapped edges of the former sheets, and the three lapped sheets were press bonded by a 240° C. hot press for 30 seconds. On the surface of the soft vinyl chloride resin layers of the bonded test pieces thus obtained, lapped were tent base-cloth test pieces of the same size (100 mm in length×5 mm in width), and the lapped sheets were press bonded again by a 165° C. hot press for 30 seconds to obtain their 190 mm respective bonded test pieces (1). Then, the joints of the bonded test pieces (1) were high-frequency welded from the side of the vinylidene fluoride resin sheet under the same conditions as with Embodiment 1 to obtain their respective bonded test pieces (2). Tensile tests were conducted on the resulting bonded test pieces (1) and (2) under the same test conditions as with Embodiment 1 to measure the bonding strength of the joints. Measurement results are shown in FIG. 1. The abscissa of FIG. 1 denotes the content (wt. %) of the vinylidene fluoride resin in the bonding-layer material resin, and the ordinate thereof denotes bonding strength (unit: kg/cm). As is evident from FIG. 1 and Table-1 data, the bonding strength of the bonded test pieces (2) (FIG. 1) showed almost similar values to the corresponding values with Embodiments 1–3 and Comparative Examples 1–3 (Table-1), in accordance with the composition ratio of the bonding-layer material resin, while the bonding strength of the bonded test pieces (1) showed lower values than the corresponding values with the bonded test pieces (2). For comparison, the bonding strength of the test pieces (1) was shown in the rightmost column of Table-1 in accordance with the ratios of the bonding-layer material resins used.

As is evident from Table-1 and FIG. 1, the high-frequency welded laminated sheets of this invention shows bonding strength almost equal to that with the sheets in which PMMA is used in the bonding layer. Since sufficient bonding strength cannot be obtained with the bonding process using only the hot press, high-frequency welding is obviously necessary.

TABLE 1

|  | Percentage composition of bonding-layer material resin (wt. %) | Bonding strength with high frequency welding (kg/cm) | Presence or absence of whitening | Creep strength (hours) | Bonding strength after hot press (kg/cm) |
| --- | --- | --- | --- | --- | --- |
| Embodiment 1 | PVDF/copolymer 10/90 | 44.4 | ○ | No peeling in 24 hours | 15.2 (Comparative example 5) |
| Embodiment 2 | PVDF/copolymer 20/80 | 47.2 | ○ | No peeling in 24 hours | 14.8 (Comparative example 6) |
| Embodiment 3 | PVDF/copolymer 30/70 | 45.2 | ○ | No peeling in 24 hours | 14.0 (Comparative example 7) |
| Comparative example 1 | PVDF/copolymer 0/100 | 19.6 | ○ | 41 min. | 15.9 (Comparative example 8) |
| Comparative example 2 | PVDF/copolymer 50/50 | 14.4 | ○ | 24 min. | 8.0 (Comparative example 9) |
| Comparative example 3 | PVDF/copolymer 100/0 | 0 | — | 0 min. (Failure to adhere) | 0 (Comparative example 10) |
| Comparative example 4 | PMMA 100 | 45.2 | X | — | — |

As has been described in detail in the foregoing, the bonded sheet provided by this invention is so flexible that it is not readily whitened even when Folded. By high-frequency welding, high bonding strength can be obtained at relatively high temperatures. Consequently, when the laminated sheet of this invention is used for tent fabrics, tent structures having excellent bonding strength at joints can be obtained under various service conditions. The laminated sheet of this invention can be used not only for tent fabrics but also for various tarpaulin sheets for ships, trucks, railroad freight cars, civil engineering and construction, warehouses and agricultural applications in which flexibility is required.

What is claimed is:

1. A laminated sheet suitable for bonding by high frequency welding comprising a vinylidene fluoride resin layer (A) 1–30 μm thick;

a bonding layer (B) 1–20 μm thick consisting essentially of
  (1) 70–90% by weight of copolymer resin comprising 60–90 mol % of methyl methacrylate and 40–10 mol % of alkyl ester of acrylate, whose alkyl group has 3–5 carbon atoms, and
  (2) 10–30% by weight of vinylidene fluoride resin; and
a base layer (C) 10–100 μm thick of vinyl chloride resin, which is bonded to said bonding layer (B).

2. A laminated sheet as set forth in claim 1 wherein said layer (A) consists essentially of vinylidene fluoride resin, said bonding layer (B) consists essentially of 70–90% by weight of copolymer resin comprising 70–80 mol % of methyl methacrylate and 30–20 mol % of butyl acrylate, and 10–30% by weight of vinylidene fluoride resin, and a base layer (C) consisting essentially of vinyl chloride resin.

3. A laminated sheet as set forth in claim 1 wherein said bonding layer (B) contains an ultraviolet light absorbent.

4. A laminated sheet as set forth in claim 1 wherein said laminated sheet has a base-cloth layer (D) 0.1–40 mm thick comprising canvas or waterproof cloth bonded to said base layer (C).

5. A laminated sheet as set forth in claim 1 wherein a plasticizer is blended with said vinyl chloride resin of said base layer (C).

6. A laminated sheet as set forth in claim 4 wherein a coating layer (E) of acrylic ester resin is provided on said base-cloth layer (D).

7. A laminated sheet bonded by high frequency welding treatment to a fabric layer wherein the laminated sheet comprises a vinylidene fluoride resin layer (A) 1–30 μm thick;

a bonding layer (B) 1–20 μm thick consisting essentially of
  (1) 70–90% by weight of copolymer resin comprising 60–90 mol % of methyl methacrylate and 40–10 mol % of alkyl ester of acrylate, whose alkyl group has 3–5 carbon atoms, and
  (2) 10–30% by weight of vinylidene fluoride resin; and a base layer (C) 10–100 μm thick comprising vinyl chloride resin, which is bonded to said bonding layer (B).

8. A laminated sheet as set forth in claim 7 wherein said layer (A) consists essentially of vinylidene fluoride resin, said bonding layer (B) consists essentially of 70–90% by weight of copolymer resin comprising 70–80 mol % of methyl methacrylate and 30–20 mol % of butyl acrylate, and 10–30% by weight of vinylidene fluoride resin, and said base layer (C) consists essentially of vinyl chloride resin.

9. A laminated sheet as set forth in claim 7 wherein said laminated sheet has a base-cloth layer (D) 0.1–40 mm thick comprising canvas or waterproof cloth bonded to said base layer (C).

10. A laminated sheet as set forth in claim 9 wherein a coating layer (E) of acrylic ester resin is provided on said base-cloth layer (D).

11. A laminate comprising a first laminated sheet bonded by high-frequency welding treatment to a second laminated sheet, wherein said first laminated sheet comprises a vinylidene fluoride resin layer (A) 1–30 μm thick consisting essentially of vinylidene fluoride;

a bonding layer (B) 1–20 μm thick consisting essentially of
  (1) 70–90% by weight of copolymer resin comprising 60–90 mol % of methyl methacrylate and 40–10 mol % of alkyl ester of acrylate, whose alkyl group has 3–5 carbon atoms, and
  (2) 10–30% by weight of vinylidene fluoride resin; and a base layer (C) 10–100 μm thick comprising vinyl chloride resin, which is bonded to said bonding layer (B) and wherein the second laminated sheet is the same as the first laminated sheet.

12. A laminate as set forth in claim 11 wherein in the first laminated sheet said layer (A) consists essentially of vinylidene fluoride resin, said bonding layer (B) consists essentially of 70–90% by weight of copolymer resin comprising 70–80 mol % of methyl methacrylate and 30–20 mol % of butyl acrylate, and 10–30% by weight of vinylidene fluoride resin, said base layer (C) consists essentially of vinyl chloride resin and a plasticizer, and wherein the first laminated sheet further a base cloth layer (D) consisting essentially of canvas or waterproof cloth bonded to said base layer (C).

13. A laminate as set forth in claim 12 wherein the first laminated sheet further comprises a coating layer (E) of acrylic ester resin provided on said base-cloth layer (D).

14. A laminate comprising a first laminated sheet bonded by high frequency welding treatment to a second laminated sheet, wherein first laminated sheet comprises a vinylidene fluoride resin layer (A) 1–30 μm thick consisting essentially of vinylidene fluoride;

a bonding layer (B) 1–20 μm thick consisting essentially of
  (1) 70–90% by weight of copolymer resin consisting essentially of 70–80 mol % of methyl methacrylate and 30–20 mol % of alkyl ester of acrylate, whose alkyl group has 3–5 carbon atoms, and
  (2) 10–30% by weight of vinylidene fluoride resin; and a base layer (C) 10–100 μm thick consisting essentially of vinyl chloride resin and a plasticizer, which is bonded to said bonding layer (B), and a base-cloth layer (D) of canvas or waterproof cloth 0.1–40 mm thick and wherein the second laminated sheet is the same as the first laminated sheet.

15. A laminate as set forth in claim 14 wherein the first laminated sheet further comprises a coating layer (E) of acrylic ester resin provided on said base-cloth layer (D).

* * * * *